(12) United States Patent
Wang et al.

(10) Patent No.: US 7,776,963 B2
(45) Date of Patent: Aug. 17, 2010

(54) ACRYLIC ADHESIVES FOR METAL BONDING APPLICATIONS

(75) Inventors: Xiaobin Wang, North Andover, MA (US); Daniel K. Doe, Hyde Park, MA (US); Patricia M. Savory, Danvers, MA (US); Kenneth A. Lambert, Billerica, MA (US)

(73) Assignee: Illinois Tool Works Inc., Glenview, IL (US)

( * ) Notice: Subject to any disclaimer, the term of this patent is extended or adjusted under 35 U.S.C. 154(b) by 1303 days.

(21) Appl. No.: 11/120,789

(22) Filed: May 3, 2005

(65) Prior Publication Data

US 2006/0252866 A1 Nov. 9, 2006

(51) Int. Cl.
*C09J 9/00* (2006.01)
*C09J 4/02* (2006.01)
*C09J 11/06* (2006.01)
*C09J 11/08* (2006.01)
*C09J 133/06* (2006.01)
*C09J 153/02* (2006.01)
*C09J 5/04* (2006.01)

(52) U.S. Cl. .............................. 525/71; 525/83; 525/85; 525/87; 525/93; 525/94; 525/259; 525/268; 525/308; 525/309; 524/560

(58) Field of Classification Search .................... 525/71, 525/83, 85, 86, 87, 93, 94, 259, 268, 308, 525/309; 524/560
See application file for complete search history.

(56) References Cited

U.S. PATENT DOCUMENTS

| 4,536,546 | A | | 8/1985 | Briggs |
| 4,574,138 | A | * | 3/1986 | Moran et al. ................. 524/786 |
| 4,714,730 | A | | 12/1987 | Briggs |
| 4,773,957 | A | | 9/1988 | Briggs |
| 4,942,201 | A | | 7/1990 | Briggs et al. |
| 4,959,405 | A | | 9/1990 | Briggs et al. |
| 5,112,691 | A | | 5/1992 | Briggs et al. |
| 5,206,288 | A | | 4/1993 | Gosiewski et al. |
| 5,656,345 | A | | 8/1997 | Strand et al. |
| 5,883,193 | A | * | 3/1999 | Karim ......................... 525/113 |
| 6,462,126 | B1 | * | 10/2002 | Gosiewski et al. .......... 524/560 |
| 6,512,043 | B2 | * | 1/2003 | Wang et al. .................. 524/560 |
| 6,730,411 | B1 | * | 5/2004 | Doe et al. .................... 428/500 |

FOREIGN PATENT DOCUMENTS

| EP | 0 273 415 | | 7/1988 |
| EP | 273415 | A * | 7/1988 |

OTHER PUBLICATIONS

George Odian, Principles of Polymerization, Third Edition, 1991, pp. 262-263, Wiley Interscience.

* cited by examiner

*Primary Examiner*—Kelechi C Egwim
(74) *Attorney, Agent, or Firm*—Fletcher Yoder

(57) ABSTRACT

Adhesive formulations having acrylate monomer or methacrylate monomer, or mixtures thereof, and having a reducing agent and an initiator (e.g., peroxide). The formulations may include a chelating agent solution to improve storage stability and other properties. Further, the mole ratio of the initiator to the reducing agent may be adjusted to control weight loss of the adhesives during cure. Polyvinyl acetate or its derivatives may also be employed in the adhesive formulations to reduce weight loss during cure. Moreover, certain embodiments of the formulations include a toughening-agent copolymer having a glass transition temperature (of at least one domain) that is lower than −50° C. (−58° F.). These toughening-agent copolymers may be added to the adhesive formulations to improve impact strength and other properties of the cured adhesives at lower temperatures, e.g., −40° C. (−40° F.), while maintaining performance of the cured adhesives at higher temperatures, e.g., 82° C. (180° F.).

24 Claims, No Drawings

ACRYLIC ADHESIVES FOR METAL BONDING APPLICATIONS

BACKGROUND OF THE INVENTION

The invention relates generally to acrylate/methacrylate adhesives, including those used to bond metal substrates and metal objects. More particularly, the invention relates to such adhesives having improved storage stability, improved toughening and impact properties, and reduced weight loss during cure. While the present adhesives may be directed to bonding metal components, it should be emphasized that the present adhesives may also be used to bond non-metal components.

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Acrylate and methacrylate-based adhesives are used to bond components, such as in the construction and repair of cars, trucks, trailers, buses, boats, and other products and structures. Typically, two parts of the adhesive system are prepared and stored prior to mixing the two parts to give the final adhesive. In certain formulations, one part of the adhesive may be labeled the adhesive part or adhesive side, and the other part may be labeled the activator part or activator side. Typically, the adhesive part includes the acrylate and methacrylate monomers to be polymerized, and a reducing agent. The activator part typically includes initiators of the polymerization, such as peroxides.

During curing of the mixed adhesive parts, the reaction or polymerization of the acrylate and/or methacrylate monomers is exothermic. Thus, the adhesive typically experiences an increase in temperature until a peak exotherm temperature is reached. After the adhesive reaches its peak exotherm temperature, the temperature of the adhesive may gradually return to ambient temperature. On the other hand, external heat may be applied to the curing adhesive prior to allowing the adhesive to return to ambient temperature. Cure characteristics or the cure profile of an adhesive may include the peak exotherm temperature, the time to reach the peak exotherm temperature, the adhesive working time (or open time), the adhesive fixture time, and so forth.

A problem with acrylate/methacrylate-based structural adhesives, such as those used to bond metal components, is poor storage stability of the adhesive part and/or activator part. Storage instability can cause stringiness (i.e., formation of conglomerations or strings of the adhesive), an increase in viscosity, reduced mixability of the adhesive, and so forth. Unfortunately, such undesirable properties caused by poor storage stability may result in inadequate wetting of the adhesive, insufficient or inconsistent adhesion, and other problems.

Another common problem with acrylate/methacrylate-based adhesives is low impact strength of the cured adhesives at low temperatures, e.g., −40° C. (−40° F.). While the cured adhesives generally have desirable properties (e.g., lap shear strength) at elevated temperatures, such as 82° C. (180° F.), the performance (e.g., impact strength) of the cured adhesives at low temperatures is generally a weakness for these types of adhesives. Unfortunately, toughening techniques that improve the low-temperature performance of the cured adhesive may sacrifice high temperature performance of the cured adhesive significantly. In general, an adequate combination of adhesive properties at these high and low temperatures may be important because customers and users of the adhesives may specify requirements of the adhesive properties at relatively extreme temperatures falling outside of typical ambient ranges, i.e., as a design margin or testing standard, for example. Moreover, an adequate combination of adhesive properties at high and low temperatures are generally important for products having parts bonded with acrylate/methacrylate-based structural adhesives that may be subjected to various weights and forces in a wide range of environments and ambient temperatures.

Lastly, acrylate/methylcrylate-based structural adhesives, including those used to bond metal components and substrates, may experience excessive weight loss during curing of the adhesives. Generally, weight loss and the associated offensive odors result from volatization of the adhesive ingredients such as the monomer. Weight loss of the adhesive during cure is believed to be exacerbated by use of lower molecular-weight acrylate/methacrylate monomers having low boiling points and low flash points, as well as by the exothermic polymerization (or reaction) and high exotherm temperatures, and so on.

There is a need with acrylate/methacrylate-based structural adhesives, including those used to bond metal components and metal substrates, to improve storage stability of the adhesive/activator parts. There is also a need to improve low-temperature performance (e.g., impact strength) of the cured adhesives without significantly sacrificing high-temperature performance. Moreover, there is a need to reduce weight loss of the adhesive during cure.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any product development, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

To facilitate discussion of the present techniques, the written description is provided in sections. Section I introduces the benefits of the present techniques. Section II discusses exemplary ingredients of the present adhesive formulations. Section III briefly discusses the preparation and application of the present adhesives. Section IV provides examples of the present adhesive formulations.

I. INTRODUCTION

The present techniques are directed to improving the use and performance of acrylate/methacrylate-based structural adhesives. As discussed below, the techniques may improve the storage stability of the uncured adhesives, reduce weight loss of the adhesives during cure, and improve the mechanical properties of the cured adhesives.

The present adhesive formulations are generally two-part adhesives having acrylate and/or methacrylate monomers, toughening agents (e.g., elastomers), impact modifiers (e.g., core-shell structured copolymers), reducing agents (e.g., anilines, toluidines, etc.), inhibitors/retardants, and initiators. The adhesives may also include adhesion promoters, carboxylic acids, and other compounds. The multi-part (e.g., two-part) adhesive is typically prepared as an adhesive part and an activator part. The adhesive part may include the monomers and reducing agents, and the activator part typically includes initiators (e.g., peroxides). The activator part may also include a carrier, thickening agents, and other components.

A. Storage Stability of the Uncured Adhesives

The techniques provide for the addition of a chelating agent solution to the adhesive formulations to increase storage stability. See, e.g., Table 3 below. Consequently, issues related to the storage stability problem, such as stringiness, high viscosity, and poor mixability are reduced. For certain embodiments, the improvement is dramatic, as indicated by the data presented in Table 3 below.

The chelating agent, ethylenediaminetetraacetic acid tetrasodium salt (EDTA $Na_4$) in water or in water with alcohol and/or glycol, may be added to the adhesive part of the formulation to improve the storage stability of the adhesive part. In one comparison in Table 3, the amount of the EDTA $Na_4$ solution in the adhesive part is increased from 0.94 wt % to 2 wt %, resulting in a striking improvement in storage stability. In this exemplary comparison, with the adhesive side stored for 10 days at 43° C. (110° F.) and containing only 0.94 wt % of a chelating agent solution, the adhesive side is not usable due to excessive stringiness. Under the same storage conditions with the increased addition of the chelating agent solution to 2 wt %, the adhesive side is fully usable with no visible stringiness.

In general, the chelating agent solution, such as an EDTA $Na_4$ solution or premix, is added at greater than 1 weight % of the adhesive part. However, chelating agent solutions may be added to the adhesive part in the exemplary ranges of about 0.2 wt % to about 3 wt %, about 0.5 wt. % to about 2.5 wt. %, and about 1 wt % to about 2 wt %, and so forth, depending, for example, on the types and amounts of other ingredients in the formulations. An exemplary premix or solution of EDTA $Na_4$ is 5 wt % EDTA $Na_4$ in 47.5 wt % water and 47.5 wt % ethylene glycol. See Table 1 below. Lastly, it should be noted that additional EDTA $Na_4$ premix (solution) may also enhance mechanical performance of the cured adhesives. See example 2 and Table 3 below.

B. Mechanical Properties of the Cured Adhesive

Further, with the present adhesive formulations, the impact strength of the cured adhesives is improved at low temperatures while the performance (e.g., lap shear strength) of the cured adhesives at high temperatures is not significantly sacrificed. For example, with the addition of toughening-agent copolymer having a glass transition temperature ($T_g$) of at least one domain of −91° C. (−132° F.), the impact strength of the cured adhesive at −40° C. (−40° F.) increased from 149 inch-lb/in$^2$ to 199 inch-lb/in$^2$, while lap shear strength at 82° C. (180° F.) on Al 6061 only modestly decreased from 1046 pounds per square inch (psi) to 1017 psi. See Table 4. In general, the present techniques maintain appropriate balances among elastomeric-polymer toughening agents (e.g., block copolymers) and between such toughening agents and impact modifiers (core-shell structured polymers) to provide impact strength and other characteristics of the cured adhesives at low temperatures, while substantially maintaining a beneficial combination of properties of the cured adhesives at ambient temperature and elevated temperatures, e.g., 82° C. (180° F.). Such properties of interest at ambient and elevated temperatures may involve lap shear strength, impact strength, tensile strength, cyclic fatigue performance, and so on.

In certain embodiments, to advance performance of the cured adhesives at low temperatures, toughening agents having very low glass-transition temperatures, e.g., less than −50° C. (−58° F.), may be added to the adhesive formulations. As indicated, such toughening agents reduce brittleness and increase the impact strength of the cured adhesive at low temperatures, e.g., −40° C. (−40° F.), while not significantly sacrificing properties at higher temperatures, e.g., 82° C. (180° F.). These toughening agents include copolymers (e.g., block copolymers) having a $T_g$ of at least one domain less than −50° C. (−58° F.). An exemplary range of the $T_g$ is −50° C. to −110° C. (−58° F. to −166° F.). Embodiments of these new toughening agents include styrene-butadiene-styrene (SBS) copolymers. Commercial examples of such SBS copolymers are Kraton® D1116 ($T_g$=−91° C., −132° F.) and Kraton® 1184 ($T_g$=−91° C., −132° F.) from Shell Chemical LP of Houston, Tex. Again, in one example with the addition of the very low $T_g$ SBS copolymer, Kraton® D116, the impact strength of the cured adhesive at −40° C. (−40° F.) increased significantly from 149 to 199 inch-lb/in$^2$, while the lap shear strength of the cured adhesive at 82° C. (180° F.) decreased only modestly from 1046 psi to 1017 psi. See Example 3 and Table 4.

C. Weight Loss of the Adhesive During Cure

The present techniques provide for several approaches and formulations in reducing weight loss. For example, wax may be added to the adhesive formulations to reduce weight loss. In one exemplary adhesive formulation, an increased wax content of the adhesive part from 1 wt % to 2 wt % reduced weight loss of the adhesive during cure from 2.4% to 1.4%. The techniques also provide for the addition of polyvinyl acetate and/or its derivatives to the adhesive formulation to reduce weight loss of the adhesive. For example, based on the data presented in Tables 5 and 6, weight loss is reduced by at least 1% with the addition of 10 wt % of polyvinyl acetate (PVAc) to the adhesive part. Furthermore, the present techniques also provide for adjusting the molar ratio between reducing agents and oxidizing agents in the present formulations to reduce weight loss. For example, the molar ratio of initiator to reducing agent may be decreased to lower the peak exotherm temperature in order to reduce the weight loss of the adhesives during cure. Advantageously, in certain embodiments, such lowering of this molar ratio may be implemented without significant alteration of the cure profile of the adhesive. In an embodiment, a decrease in the molar ratio by a factor of about 3 of the sole initiator dibenzoyl peroxide (BPO) to the reducing agent decreased the peak exotherm temperature from 278° F. to 195° F., and reduced weight loss from 1.18% to 0.45% while the exotherm temperatures remained similar. See Tables 2 and 6. This reduction in weight loss is realized even though polyvinyl acetate is omitted from the exemplary formulation having the decreased molar ratio.

II. COMPONENTS OF THE ADHESIVE FORMULATIONS

As discussed, the types, amounts, and ratios of components in the adhesive part and activator part may be adjusted to increase the storage stability of the parts, regulate weight loss during cure of the adhesive, and improve mechanical properties of the cured adhesive, and so forth. Again, storage stability is improved with the addition of chelating agent solutions. Weight loss is reduced with the addition of wax, and/or polyvinyl acetate and/or its derivatives, as well as by control of the molar ratio of the reducing agent to the oxidizing agent or initiator. Moreover, as indicated, the present balances among elastomeric-polymer toughening agents, and between elastomeric-polymer toughening agents and impact modifiers (e.g., core-shell structured polymers) can be employed to maintain a combination of lap shear strength, impact strength, tensile strength and cyclic fatigue performance of cured adhesives at low temperatures, e.g., less than −40° C. (−40° F.), while not sacrificing performance at elevated temperatures. As used herein and discussed below, toughening agents generally refer to block copolymers and other elastomers, while impact modifiers generally refer to core-shell copolymers.

Again, the adhesives of the present techniques typically include at least two parts, the adhesive part and the activator part, which are mixed together prior to application of the adhesives. These two parts may be stored by the manufacturer or end-user prior to the mixing of the two parts to give the final mixed adhesive. For the adhesive part (prior to polymerization), exemplary components and their exemplary ranges in weight percent of the adhesive part are given in Table 1 and discussed following Table 1. As indicated, the adhesive part formulations encompassed in Table 1 are generally employed and mixed with initiators (e.g., peroxides) in the activator part to bond objects. Adhesive applications may include the construction and repair of vehicles, such as automobiles, cars, passenger trucks, transport trucks, livestock trucks, trailers, buses, boats, and so on. Of course, an adhesive part falling within the exemplary ranges of Table 1 may be initiated or activated for other applications.

TABLE 1

Exemplary Composition Ranges of the Adhesive Part

| Component | Exemplary Ranges, % by weight of the adhesive part | | |
|---|---|---|---|
| | Ranges X | Ranges Y | Ranges Z |
| (Meth)Acrylate monomer(s) | 40-70 | 45-65 | 50-60 |
| Carboxylic acid(s) | 0-10 | 2-8 | 4-6 |
| Chelating Agent Premix$^a$ | 0.2-3 | 0.5-2.5 | 1-2 |
| Toughening agent(s), $T_g \geq -50°$ C. | 0-16 | 2-12 | 4-8 |
| Toughening agent(s), $T_g < -50°$ C. | 1-8 | 2-6 | 3-5 |
| Impact modifier(s) | 10-30 | 13-25 | 16-22 |
| Adhesion promoter(s) | 0.5-5 | 1-4 | 2-3 |
| Reducing agent(s) | 0.1-2 | 0.2-1.6 | 0.4-1.4 |
| Inhibitor(s)/Retarder(s) | 0.001-0.15 | 0.005-0.1 | 0.01-0.08 |
| Corrosion inhibitor | 0-1 | 0.2-0.8 | 0.4-0.6 |
| Wax | 0.5-4 | 0.8-3 | 1-2 |
| Metallic di(meth)acrylate(s) | 0-2 | 0.4-1.6 | 0.8-1.2 |
| Polyvinyl acetate | 0-15 | 3-12 | 5-10 |

$^a$5% EDTA Na$_4$ (ethylenediaminetetraacetic acid tetrasodium salt) in 47.5% of water and 47.5% ethylene glycol. Chelating agents other than EDTA Na$_4$ may also be used. The solvent may be water, a water/alcohol combination, a water/glycol combination, or a water/alcohol/glycol combination.

A. Acrylate/Methacrylate Monomers

In general, the acrylate and/or methacrylate monomers include a combination of higher molecular weight (MW) and lower molecular weight (MW) acrylates and methacrylates which are polymerized during the curing process. The lower MW monomers may be characterized by the alcohol portion of the ester group having 1 to 2 carbon atoms, and the higher MW monomers may be characterized by the alcohol portion of the ester group having 3 to 20 carbon atoms. The acrylate and/or methacrylate monomers, and their mixtures, have the following general structures.

Acrylates: $CH_2=CH-COOR$, and

Methacrylates:

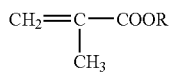

where $R=C_nH_{n+1}$, and where n=1, 2, 3 . . . 20.

Again, the majority of the monomers are lower MW monomers, generally those with $n \leq 2$, and commonly those with n=1, which are methyl acrylate and methyl methacrylate (MMA).

The higher MW monomers, those with n>2, commonly n=10-18, and more commonly n=12-16, may be optionally used, for example, to improve the anti-sliding performance, reduce shrinkage, lower the peak exotherm temperature to avoid a monomer boil problem, and so on. However, to avoid unacceptable mechanical properties and poor chemical resistance of the final cured adhesive, the amount of these higher MW monomers generally does not exceed 15 wt % based on the adhesive part. In certain embodiments, the amount is less than 10 wt % based on the adhesive part. In other embodiments, the amount of these higher MW monomers is less than 5 wt % based on the adhesive part. A commercial example of these higher MW monomers employed in the present formulations is SR 313B, which is a mixture of $C_{12}$, $C_{14}$, and $C_{16}$ methacrylates from Sartomer Company, Inc. of Exton, Pa. Another commercial example of a mixture of $C_{12}$, $C_{14}$, and $C_{16}$ methacrylates employed with the present techniques is AGEFLEX™ FM246 from Ciba Specialty Chemicals of Basel, Switzerland.

B. Carboxylic Acids

Optionally, one or more organic acids, such as carboxylic acids, may be employed in the adhesive formulation to enhance adhesion to substrates or components, and to increase heat resistance. Exemplary carboxylic acids include methacrylic acid, maleic acid, acrylic acid, crotonic acid, fumaric acid, malonic acid, and so on. Additional examples of these organic or carboxylic acids are acetylene dicarboxylic acid, dibromo maleic citranoic acid, mesaconic acid, and oxalic acid. By adding one or more carboxylic acids, particularly strong organic carboxylic acids, to the present acrylate and/or methacrylate-based adhesive compositions, the bonding characteristics of the adhesive compositions to the subsequently bonded structural components and parts are improved. It is believed that the addition of carboxylic acids acts to promote adhesion, in part, due to interactions at the molecular level. Typically, the present formulations contain less than 10 wt. % of carboxylic acids. It has further been discovered that the addition of water to compositions containing these acids can increase their effectiveness, apparently through partial or enhanced solubility, which is believed to aid in the dissociation thereof. These adhesive effects can further be enhanced by heat treatment of the bonds either during and/or after the bonding steps, such as paint baking processes in the transportation industry.

C. Chelating Agent Solutions

Chelating agents, such as hexadentates, bidentates, tridentates, and other compounds can be used to substantially prevent premature curing related to contact of the adhesives to bare metals. The chelating agent, EDTA Na$_4$ (a hexadentate) is an example. In general, chelating agents may reduce premature curing caused by the presence of metals in the adhesive. Such metals may originate from metal residues in the adhesive raw materials, from metal contact during manufacturing, and from adhesive dispensing equipment constructed of metal, for example. In general, metal contamination of the adhesive may occur during manufacturing, transport, storage, and application of the adhesive.

The chelating agent is typically substantially dissolved in a solvent or a mixture of solvents to facilitate incorporation of the chelating agent into the adhesive formulation. The chelating agent solution is generally added to the adhesive part of the formulations. The solvent in the solution or premix of the chelating agent may include water, as well as alcohol and/or glycol. The glycol employed as a solvent of the EDTA Na$_4$ may include ethylene glycol, propylene glycol, and other glycols. It is believed in certain embodiments, that the solvents (e.g., water, glycol, alcohol, etc.), in addition to or instead of the chelating agent, may improve the storage stability and other properties of the adhesive.

As discussed, addition of an exemplary EDTA Na$_4$ premix (e.g., 0.2 wt % to 3 wt %) increases the stability of the adhesive part. As can been seen in Table 4 below, the improvement in storage stability is greater for concentrations of EDTA Na$_4$ premix in the adhesive part exceeding 1 wt % based on the adhesive part. It should be noted that this beneficial effect of improved stability may be especially pronounced where the adhesive formulations contain the toughening agent, polychloroprene such as Neoprene (discussed below), and/or contain corrosion inhibitors such as metallic oxides of zinc and molybdenum (also discussed below). Moreover, the mechanical property data presented in Table 4 show that the addition of EDTA Na$_4$ premix also improves mechanical properties of cured adhesives. Lastly, it should be emphasized that chelating agents other than EDTA Na$_4$ can also be used. Indeed, a variety of chelating agent solutions may be employed in the present adhesive formulations.

D. Toughening Agents

Toughening agents include elastomeric polymers, and generally have a glass transition temperature ($T_g$) of less than −25° C. (−13° F.), and advantageously less than −50° C. (−58° F.). Further, these toughening agents may beneficially be soluble in the monomers described above, and may include synthetic high polymers. These elastomers may be supplied commercially as adhesive or cement grades, and may include Neoprene (polychloroprene), copolymers of butadiene with styrene, and other copolymers of acrylonitrile, acrylates, methacrylates, and the like. A commercial example of a toughening agent used to modify the acrylate/methacrylate-based adhesives and having a $T_g$ in the range of −25° C. to −50° C. (−13° F. to −58° F.) is Neoprene AD10 (a polychloroprene product having a $T_g$ of about −43° C., −45° F.) from DuPont Dow Elastomers Company of Wilmington, Del. Generally, Neoprene not only improves toughness and impact strength of acrylate and/or methacrylate-based adhesives, but also provides good adhesion and tear strength.

However, acrylate and/or methacrylate-based adhesives modified with toughening agents having a $T_g$ in the range of −25° C. to −50° C. (−13° F. to −58° F.) may perform poorly at low temperatures. For example, as described, the cured adhesives may become brittle (lower impact strength) at low temperatures, e.g., −40° C. (−40° F.) or lower. Thus, to improve impact strength at low temperatures, the toughening agents added to the present adhesive formulations may include very low $T_g$ elastomeric polymers that are soluble in the acrylate and/or methacrylate monomers. The type and amounts of these very low $T_g$ polymers, e.g., $T_g$ less than about −50° C. (−58° F.), may be selected to increase impact strength at low temperatures while not substantially sacrificing performance at high temperatures.

In particular, toughening agents having a $T_g$ of at least one domain in the range of about −50° C. to about −110° C. (−58° F. to −166° F.), about −65° C. to about −105° C. (−85° F. to −157° F.), and/or about −80° C. to about −100° C. (−112° F. to −148° F.), are added to the present adhesive formulations. Examples include styrene-butadiene-styrene (SBS) copolymers. The radial type of these SBS polymers may be particularly beneficial as a toughening agent. As mentioned, commercial examples of these SBS copolymers are Kraton® D1116 ($T_g$=−91° C. or −132° F.) and Kraton® 1184 ($T_g$=−91° C. or −132° F.) from Shell Chemical LP of Houston, Tex. The toughening agents can improve toughness and impact resistance of cured adhesives at low temperatures, e.g., less than −40° C. (−40° F.), while not adversely affecting performance (e.g., lap shear strength) of cured adhesives at elevated temperatures, e.g., 66° C. to 104° C. (150° F. to 220° F.). As indicated in Table 1, the total amount of toughening agents generally falls within about 1 wt % to 24 wt % of the present adhesive formulations. Among the toughening agents, these very low $T_g$ toughening agents having a $T_g$ lower than −50° C. (−58° F.) are about 1-8 wt %, commonly 2-6 wt %, and more commonly 3-5 wt % of the adhesive part. In certain embodiments, relatively smaller amounts of these very low $T_g$ toughening agents may be added if there is are other toughening agents, e.g., having $T_g$ higher than −50° C. (−58° F.), in the adhesive formulations.

E. Impact Modifiers

Impact modifiers include core-shell structured polymers that can swell in the methacrylate and/or acrylate monomers. The adhesives formulated with impact modifiers exhibit desirable properties for many adhesive applications. For example, impact modifiers have a similar effect on the cured adhesives as toughening agents in reducing brittleness and increasing impact strength of the cured adhesives. The impact modifiers may also improve non-sag and thixotropic properties, and anti-sliding performance in the uncured adhesives. As expressed herein, the impact modifiers generally include graft copolymers that may be characterized as core-shell copolymers having a rubbery "core," a hard "shell," and that swell in the methacrylate and/or acrylate monomer compositions but do not dissolve therein. Examples of core-shell copolymers are those where the hard "shell" monomers, such as styrene, acrylonitrile, or methyl methacrylate, are grafted onto a rubbery "core" made from polymers of butadiene, butyl acrylate, ethyl acrylate, isoprene and the like. One type of core-shell polymers is methacrylate butadiene styrene (MBS) copolymer made by polymerizing methyl methacrylate in the presence of polybutadiene or a polybutadiene copolymer rubber. Commercial examples of such MBS copolymers are PARALOIDO BTA-753 from Rohm and Haas Company of Philadelphia, Pa., and KANE ACE B-564 from Kaneka Tex. Company of Houston, Tex. As indicated in Table 1, the amount of impact modifiers (core-shell copolymers) generally falls within about 10 wt % to 30 wt % based on the adhesive part of the present formulations.

F. Adhesion Promoters

Adhesion promoters other than carboxylic acids include phosphates, such as methacryloxyethyl acid phosphate and acryloxyethyl acid phosphate, and so on. These compounds improve adhesion to various bare metal substrates. As listed in Table 1, the amount of such adhesion promoters in the adhesive formulations generally falls within about 0.5 wt % to about 5 wt % based on the adhesive part. A commercial example of a phosphate employed as an adhesion promoter is Light Ester P-2M from Kyoeisha Chemical Co., Ltd. of Tokyo, Japan.

G. Reducing Agents

Reducing agents accelerate curing of methacrylate and/or acrylate-based adhesives over a relatively broad range of temperatures generally by accelerating the decomposition rate of initiators. Exemplary reducing agents include anilines, toluidines, substituted anilines, substituted toluidines, their mixtures, and so on. Specific examples of reducing agents when peroxides such as dibenzoyl peroxide (BPO) are used as initiators are N,N-dialkylaniline and N,N-dialkyltoluidine. The amount of reducing agents employed in the adhesive formulations generally falls within about 0.1 wt % to about 2 wt % based on the adhesive part.

H. Inhibitors/Retardants

Inhibitors/retardants may be used to prevent premature curing, and may be used in conjunction with the redox system (initiator/reducing agent system) to provide for a desired cure profile. Examples for acrylate and/or methacrylate systems may include butylated hydroxytoluene (BHT), quinones (e.g., hydroquinone, benzoquinone, etc.), nitrobenzene, 1,3, 5-trinitrobenzene, sulfur, aniline, phenol, chloronil, and so on. As given in Table 1, the inhibitors/retardants generally fall within about 0.001 wt %-0.15 wt % of the adhesive part.

I. Corrosion Inhibitors

Corrosion inhibitors can be used to prevent corrosion of metal substrates and improve the durability of bonds involving metal substrates, especially in humid or corrosive environments. Exemplary corrosion inhibitors may include zinc oxide, zinc molybdate, and other chemicals. A commercial example of an inhibitor having zinc oxide and zinc molybdate is MOLY-WHITE® 101 ED Plus from Moly White Pigments Group of Cleveland, Ohio. As indicated in Table 1, corrosion inhibitors are generally less than about 1 wt % (based on the adhesive part) of the present formulations.

J. Wax

Wax may be used to reduce evaporation of monomer from the surface of adhesives during application of the adhesive. An exemplary melting point range of wax utilized is about 43° C. to 77° C. (110° F. to 170° F.). A category of wax employed is petroleum hydrocarbon wax. Commercial examples of such petroleum waxes are Boler 1977 wax and IGI 1230 wax, both from IGI Inc. of Buena, N.J. Generally, only about 0.5 to 4 wt % of the present formulation, based on the adhesive part, is wax. Excessive amounts of wax may adversely affect mechanical properties and adhesion of the cured adhesive, particularly in metal bonding applications. Therefore, additional approaches (e.g., adding polyvinyl acetate and/or lowering the molar ratio of reducing agent to initiator) may supplement wax addition to reduce monomer boiling (and weight loss) while not significantly sacrificing other properties.

K. Metallic Di(meth)acrylates

Metallic di(meth)acrylates generally improve adhesion of the adhesive to metal substrates. Such compounds may also improve mechanical properties of the cured adhesive, as well as the heat and chemical resistance of the cured adhesives. Moreover, metallic di(meth)acrylates generally promote the development of strength taught in the adhesive, as described in U.S. Pat. No. 6,730,411, which is incorporated herein by reference. A commercial example of metallic di(meth)acrylates is SR 708 (a zinc dimethacrylate) from Sartomer Company, Inc.

L. Polyvinyl Acetate (and Derivatives)

As discussed, vinyl acetate homopolymers and/or their derivatives, and other compounds, may be used in methacrylate and/or acrylate-based adhesives to reduce the weight loss of the adhesives during cure. For example, polyvinyl acetate is added to the present adhesive formulations (e.g., less than 15 wt % of the adhesive part) to reduce weight loss. See, e.g., Tables 1 and 6. In one example, adding polyvinyl acetate reduced weight loss by at least 1%. Polyvinyl acetate may also be utilized as a shrink control agent. A commercial example of polyvinyl acetate is PVA B-15 from McGean Rohco, Inc. of Cleveland, Ohio.

M. Initiators

The activator parts of the present adhesive generally include an initiator, such as peroxides and other compounds. Exemplary peroxides include dibenzoyl peroxide (BPO), cumene hydroperoxide, and so on. In certain embodiments, BPO may be used as sole initiator or primary initiator, and more stable peroxides such as cumene hydroperoxide may be used as co-initiators or secondary initiators. Co-initiators may be used, for example, in order to have more complete initial conversion especially when a slow cure adhesive is desired. The mole ratio of co-initiators to the primary initiators is generally less than 0.5. Exemplary ranges of this mole ratio are about 0.1 to 0.4 in certain embodiments, and about 0.2 to 0.3 in other embodiments. As discussed below, the activator part may include a carrier, thickening agent, and/or other compounds (e.g., colorants).

N. Carrier

The initiators may be commercially available with a carrier in solid form or liquid form, such as a solution, suspension, emulsion, paste, and so forth. Generally, the carrier ingredients are inert to the initiators under typical storage conditions. Example ingredients include water, plasticizers, surfactants, and so on. Moreover, additional amounts of carrier ingredients may be added to the activator part to adjust the concentration of the initiator and the viscosity and specific gravity of the activator part, and so forth. In total, the amount of carrier is generally less than 20 wt % of the total adhesive (the combined weight of the adhesive side and the activator side) and commonly less than about 10 wt %. Exemplary weight ranges based on the total adhesive are about 2%-20%, 4%-15%, and 6%-10%.

O. Thickening Agents

Moreover, thickening agents may be employed to improve mixability and other properties of both parts, and to modify the viscosity, specific gravity, and thixotropic property of the activator side. The thickening agents that may be added to the activator part include inorganic fillers, organic fillers, and/or inert polymers that can be dissolved, swollen or suspended in the carrier, for example.

P. Ratios and Other Ingredients

Other ingredients, such as chain transfer agents, pigments, spacers, fragrance, fillers, fire retardants, and so on, may be added into the activator side and/or the adhesive side of the present formulations. Moreover, whole or partial amounts of various ingredients in the adhesive part may be moved from the adhesive part to the activator part. Such ingredients may include certain toughening agents, impact modifiers, inhibitors/retardants, chain transfer agents, and so on. Generally, relocated ingredients are substantially inert to the initiators in the activator part.

Furthermore, the adhesive part and the activator part can be formulated at various ratios between the two parts in a very broad range. The ratio of the adhesive part to the activator part is generally within the range of 100:1 to 2:1 by volume. A practical ratio of the adhesive part to the activator part is 10:1 by volume because of commercially available packaging and dispensing equipment. Moreover, the mole ratio of the sole/primary initiators in the activator part to the reducing agents in the adhesive part may be in the exemplary range of about 0.5 to 10, commonly about 1 to 5.

III. PREPARING AND APPLYING THE ADHESIVES

Initially, the adhesive part and activator part of acrylate/methacrylate-based adhesives are prepared. As indicated, the volume ratio of the adhesive part to the activator part can vary greatly. Moreover, the molar ratio of the sole/primary initiator(s) in the activator part to the reducing agent(s) in the adhesive part may be adjusted.

During preparation, the sequence in which the adhesive ingredients are combined and mixed to formulate the adhesive part and activator part can vary significantly, depending, for example, on type of toughening agents, loading of impact modifiers, and so forth. In general, raw materials and ingredients of the formulations may be delivered in bags, tote bins, drums, tank trucks, rail cars, pipeline, and so on. The raw materials may be stored on-site in vessels, warehouses, etc. by a distributor or by the adhesive manufacturer, or used by the adhesive manufacturer as they are received.

The commercial preparation the adhesive and activator parts may involve low-speed and/or high-speed mixing of the ingredients, preparing stock solutions or premixes, cooling the adhesive formulations at intermediate and final steps, degassing batches with or without a vacuum, and so on. As appreciated by those of ordinary skill in the art, equipment that may be employed in formulating the two parts include vessels, piping, valves, transfer pumps, vacuum pumps and jets, mixers (e.g., high speed agitators or dispersers), and so forth. The adhesive part and activator part may be delivered to the end-user in differing types of containers, ranging from relatively small cartridges to 55-gallon drums, and the like.

After preparation of the two parts of the adhesive, they may be stored in inventory by the adhesive manufacturer, the distributor, end-user, and so on. On the other hand, the two parts may be mixed and applied soon after transport (without intermediate storage) to bond objects. To apply the adhesive, the adhesive part and activator part (and other parts) are combined or mixed together, as discussed. The combined adhesive formulation may then be applied to a first component and/or a second component. After such application of the adhesive, the first component and the second component may be bonded to each other via the applied adhesive. Lastly, the adhesive is allowed to cure, generally at ambient temperature or room temperature.

IV. EXAMPLES

Aspects and embodiments of the present techniques will be described with reference to the following examples. These examples are provided for purposes of illustration and are not intended to be construed as limiting the scope of the techniques.

Example 1

Table 2 provides an example composition of the activator part of the present adhesive formulations. In general, as mentioned, the activator part may include a sole initiator. On the other hand, the activator part may include a primary initiator and a co-initiator. Exemplary ranges of the mole ratio of the co-initiators (when employed) to the primary initiators are generally less than 0.5.

In Example 1, the activator part includes a sole initiator, BPO, which is in a paste form sold under the trade name LUPERCO ANS by Elf Atochem North America Inc. of Philadelphia, Pa. In this example, the carrier of the BPO may include plasticizers and surfactants. An exemplary plasticizer is diisodecyl adipate (DIDA). Furthermore, as indicated in Table 2, the activator part may include thickening agents. Examples of thickening agents are EPON® 828, Paraloid® BTA-753, and an activator premix having Kraton® 01652. The activator part may also include colorants, such as products VC10000M and VC80000 from American Colors, Inc. of Sandusky, Ohio. Lastly, as discussed, the activator part may include other components, such as certain ingredients of the adhesive part substantially inert to the initiator(s) employed.

TABLE 2

Composition of Activator Part

|  |  | Weight percent | |
|---|---|---|---|
| Ingredient |  | Ex. 1.1 | Ex. 1.2 |
| LUPERCO ANS | 55% BPO paste in plasticizer from Elf Atochem | 40.00 | 30.00 |
| EPON ® 828 | Epoxy resin from Shell Chemical Company | 18.60 | 23.20 |
| Activator Premix | 15.5% Kraton ® G1652, 84.5% DIDA | 18.60 | 23.20 |
| PARALOID ® BTA 753 | Impact modifier | 17.20 | 18.00 |
| VC10000M | White pigment dispersion from American Colors | 4.00 | 4.00 |
| VC80000 | Black pigment dispersion from American Colors | 1.60 | 1.60 |

Example 2

In Example 2, the presence of EDTA $Na_4$ Premix in the adhesive part improved the storage stability of the adhesive part. As a result, stringiness of the adhesive part is significantly reduced. Moreover, as indicated in Table 3, the EDTA $Na_4$ Premix also improved the mechanical properties of the cured adhesives.

TABLE 3

Effect of EDTA $Na_4$ Premix on Stability of Adhesive Part and on Properties of Cured Adhesives

| | Adhesive Part, % by weight | | | |
|---|---|---|---|---|
| | Ex. 2.1 | Ex. 2.2 | Ex. 2.3 | Ex. 2.4 |
| Ingredient | | | | |
| Methyl methacrylate | 20.19 | 19.69 | 19.19 | 4.61 |
| Methacrylic acid | 5.00 | 5.00 | 5.00 | 5.00 |
| 5% EDTA $Na_4$ Premix[a] | 1.00 | 1.50 | 2.00 | 0.94 |
| Neoprene AD10 Premix[b] | 50.00 | 50.00 | 50.00 | 67.75 |

TABLE 3-continued

Effect of EDTA Na$_4$ Premix on Stability of Adhesive Part and on Properties of Cured Adhesives

| | | | | |
|---|---|---|---|---|
| PARALOID ® BTA 753 | 18.00 | 18.00 | 18.00 | 16.54 |
| P-2M | 2.00 | 2.00 | 2.00 | 2.00 |
| N,N-bis(2-hydroxyethyl)-p-toluidine | 0.70 | 0.70 | 0.70 | 0.70 |
| NQ Premix[c] | 0.06 | 0.06 | 0.06 | 0.06 |
| MOLY-WHITE ® 101 ED Plus Premix[d] | 0.65 | 0.65 | 0.65 | 0.65 |
| IGI Paraffin wax 1230 | 0.75 | 0.75 | 0.75 | 0.75 |
| SR 708 | 1.00 | 1.00 | 1.00 | 1.00 |
| Stringiness | | | | |
| Aged at 110° F. for 4 days | slightly better than Ex. 2.4 | none | none | very stringy |
| Aged at 110° F. for 10 days | very Stringy | almost none | almost none | not usable |

| | Ex. 2.1/1.1 | Ex. 2.2/1.1 | Ex. 2.3/1.1 | Ex. 2.4/1.1 |
|---|---|---|---|---|
| Property | | | | |
| 10 g exotherm at RT, min./° F. | 5.23/290 | 24.25/288 | 25.39/274 | 25.23/297 |
| Tensile, psi[e] | 3303 | 3474 | 3660 | 3204 |
| Elongation, %[e] | 40 | 53 | 69 | 60 |
| Lap shear at RT, psi[f] | | | | |
| on Al 6061 | 2558 | 2460 | 2321 | 2676 |
| Failure mode[g] | CF | CF | CF | CF |
| on stainless steel 304 | 3126 | 2913 | 2708 | |
| Failure mode[g] | 90% CF | 85% CF | 85% CF | |
| on cold rolled steel 1010 | 1969 | 1518 | 1450 | |
| Failure mode[g] | AF | AF | AF | |
| Lap shear at 180° F., psi[h] | | | | |
| on Al 6061 | 1284 | 1046 | 876 | na |
| Failure mode[g] | 80% CF | 70% CF | 85% CF | |
| on stainless steel 304 | 996 | 986 | 967 | |
| Failure mode[g] | AF | AF | AF | |
| on cold rolled steel 1010 | 688 | 571 | 613 | |
| Failure mode[g] | AF | AF | AF | |
| Impact strength at −40° F., inch-lb/in$^2$[i] | | | | |
| on Al 6061 | 149 | 180 | >226 | 20 |
| Failure mode[g] | CF | CF | CF | AF |

[a]5% EDTA Na$_4$ in 47.5% of water and 47.5% ethylene glycol.
[b]The premix contains 15.35% of Neoprene AD10, 0.02% of 1,4-NQ and 84.63% of MMA.
[c]NQ Premix contains 5 wt. % napthaquinone in 5 wt. % of Santicizer 278 and 90 wt. % of methyl methacrylate (MMA).
[d]MOLY-WHITE ® 101 ED Plus Premix contains 19.5% Activator Premix, 0.5% BYK 1142, and 80% MOLY-WHITE ® 101 ED Plus.
[e]The tensile and elongation samples cured at RT for five days except that of Ex. 2.4/1.1 (overnight cure). ASTM D638-99 was followed.
[f]No surface preparation was applied to the substrate. The samples were allowed to cure at RT for overnight. The thickness of bondline was 0.012 inch except that of Ex. 2.4/1.1 (0.032 inch). ASTM D1002-99 was followed.
[g]Failure Mode: CF is Cohesive Failure and AF is Adhesive Failure.
[h]No surface preparation was applied on the substrate. The samples cured at RT for overnight and then were conditioned at 180° F. for 30 minutes before they were pulled.
[i]0.5-inch single overlap samples cured at RT for overnight and then were conditioned at −40° F. for 16 hours. Side impact on the samples was conducted on an Izod impact tester with the three-pound hammer per GM 9751P.

Example 3

The examples in Table 4 demonstrate that a relatively small amount of very low $T_g$ elastomeric polymer can improve the low temperature performance without significant loss of high temperature performance (e.g., lap shear strength at high temperature). In this example, the mix ratio of the adhesive part to the activator part is 10:1 by volume. The results in Table 4 show that the impact strength at −40° C. (−40° F.) increased with only modest loss of lap shear strength at 82° C. (180° F.).

TABLE 4

Effect of Very Low $T_g$ Elastomeric Polymer on Performance of Cured Adhesive

| | Adhesive Part, % by weight | |
|---|---|---|
| Ingredient | Ex. 3.1 | Ex. 3.2 |
| Methyl methacrylate | 19.69 | 19.69 |
| Methacrylic acid | 5.00 | 5.00 |
| 5% EDTA Na$_4$ Premix | 1.50 | 1.50 |
| Neoprene AD10 Premix | 50.00 | 40.00 |
| Kraton ® D1116 Premix[a] | — | 10.00 |
| PARALOID ® BTA 753 | 18.00 | 18.00 |
| P-2M | 2.00 | 2.00 |
| N,N-bis(2-hydroxyethyl)-p-toluidine | 0.70 | 0.70 |

TABLE 4-continued

Effect of Very Low $T_g$ Elastomeric Polymer on Performance of Cured Adhesive

| | | |
|---|---|---|
| NQ Premix | 0.06 | 0.06 |
| MOLY-WHITE ® 101 ED Plus Premix | 0.65 | 0.65 |
| IGI Paraffin wax 1230 | 0.75 | 0.75 |
| SR 708 | 1.00 | 1.00 |

| Property | Ex. 3.1/1.1 | Ex. 3.2/1.1 |
|---|---|---|
| Tensile, psi[b] | 3474 | 3098 |
| Elongation, %[b] | 53 | 75 |
| Lap shear at RT on Al 6061, psi[b] | 2460 | 2406 |
| Lap shear at 180° F. on Al 6061, psi[b] | 1046 | 1017 |
| Impact strength at −40° F., inch-lb/in[2b] | 149 | 199 |

[a]Kraton ® D1116 Premix: 25% Kraton ® D1116 in MMA.
[b]All samples cured at RT overnight prior to the test. The thickness of bondline was 0.012 inch.

Example 4

Petroleum hydrocarbon wax has been used to reduce the weight loss for many years. However, when wax level reaches about 1 to 1.5%, the effectiveness starts decreasing and certain properties of cured adhesive start deteriorating as shown in Table 5. Various approaches have been developed to reduce the weight loss during cure and consequently to reduce the odor of monomer (e.g., MMA) emitted from the adhesive. One such approach is to use polyvinyl acetate to reduce the weight loss during cure. Another approach is to increase the mole ratio of the reducing agent(s) to the initiator(s) to control the weight loss during cure by lowering the exotherm temperature, while substantially maintaining the cure rate (exotherm time). Table 6 demonstrates these two approaches.

TABLE 5

Effect of Wax on Weight Loss and Lap Shear Strength

| | Adhesive Part, % by weight | | |
|---|---|---|---|
| Ingredient | Ex. 4.1 | Ex. 4.2 | Ex. 4.3 |
| Methyl methacrylate | 19.09 | 18.59 | 18.09 |
| SR 311B | 1.00 | 1.00 | 1.00 |
| Methacrylic acid | 5.00 | 5.00 | 5.00 |
| 5% EDTA Na$_4$ Premix | 1.50 | 1.50 | 1.50 |
| Neoprene AD10 Premix | 40.00 | 40.00 | 40.00 |
| Kraton ® D1116 Premix | 10.00 | 10.00 | 10.00 |
| PARALOID ® BTA 753 | 18.00 | 18.00 | 18.00 |
| P-2M | 2.00 | 2.00 | 2.00 |
| N,N-bis(2-hydroxyethyl)-p-toluidine | 0.70 | 0.70 | 0.70 |
| NQ Premix | 0.06 | 0.06 | 0.06 |
| MOLY-WHITE ® 101 ED Plus Premix | 0.65 | 0.65 | 0.65 |
| Boler 1977 wax | 1.00 | 1.50 | 2.00 |
| SR 708 | 1.00 | 1.00 | 1.00 |

| Property | Ex. 4.1/1.1[b] | Ex. 4.2/1.1[b] | Ex. 4.3/1.1[b] |
|---|---|---|---|
| Lap shear at RT on Al 6061, psi[a] | 2318 | 2227 | 2181 |
| Lap shear at 180° F. on Al 6061, psi[a] | 1045 | 1048 | 897 |
| Weight loss during cure, %[c] | 2.4 | 1.7 | 1.4 |

[a]All samples cured at RT for overnight prior to the test. The thickness of bondline of lap shear samples was 0.012 inch.
[b]The mix ratio of the adhesive part to the activator part is 10:1 by volume.
[c]EPA test method: Determination of Weight Volatile Matter Content and Weight Solids Content of Reactive Adhesives (Appendix A to Subpart PPPP of Part 63).

Example 5

TABLE 6

Effect of Polyvinyl Acetate and Mole Ratio Adjustment of Redox System

| | Adhesive Part, % by weight | | |
|---|---|---|---|
| Ingredient | Ex. 5.4 | Ex. 5.5 | Ex. 5.6 |
| Methyl methacrylate | 18.79 | 18.19 | 17.79 |
| SR 311B | 1.00 | 1.00 | 1.00 |
| Methacrylic acid | 5.00 | 5.00 | 5.00 |
| 5% EDTA Na$_4$ Premix | 1.50 | 1.50 | 1.50 |
| Neoprene AD10 Premix | 30.00 | 40.00 | 40.00 |
| Kraton ® D1116 Premix | 10.00 | 10.00 | 10.00 |
| PARALOID ® BTA 753 | 18.00 | 18.00 | 18.00 |
| P-2M | 2.00 | 2.00 | 2.00 |
| N,N-bis(2-hydroxyethyl)-p-toluidine | 0.50 | 1.10 | 1.50 |
| NQ Premix | 0.06 | 0.06 | 0.06 |
| MOLY-WHITE ® 101 ED Plus Premix | 0.65 | 0.65 | 0.65 |
| Boler 1977 wax | 1.50 | 1.50 | 1.50 |
| SR 708 | 1.00 | 1.00 | 1.00 |
| PVA B-15 | 10.00 | — | — |

| Property | Ex. 5.4/1.1 | Ex. 5.5/1.2 | Ex. 5.6/1.2 |
|---|---|---|---|
| 10 g exotherm at RT, min./° F. | 19.9/278 | 22.6/195 | 18.6/173 |
| Lap shear at RT on Al 6061, psi 2043 | 2119 | 1989 | |
| Lap shear at 180° F. on Al 6061, psi | 845 | 967 | 861 |
| Impact strength at −40° F., inch-lb/in$^2$ | >226 | >226 | >226 |
| Weight loss during cure, % | 1.18 | 0.45 | 0.48 |

While the invention may be susceptible to various modifications and alternative forms, specific embodiments have been shown by way of example and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An adhesive formulation, comprising:
   an activator part comprising an initiator; and
   an adhesive part comprising:
      an acrylate monomer or a methacrylate monomer, or a combination thereof; and
      a chelating agent solution wherein at least a portion of a solvent of the chelating solution is water, the chelating agent solution comprising at least 1 percent by weight of the adhesive part; and
   a combination of at least two toughening agents, wherein the combination comprises:
      at least one toughening agent having a glass transition temperature of at least one domain in the range of about −25° C. to about −50° C. (about −13° F. to about −58° F.); and
      at least one other toughening agent having a glass transition temperature of at least one domain lower than −50° C. (−58° F.).

2. The adhesive formulation of claim 1, wherein the adhesive part comprises a reducing agent.

3. The adhesive formulation of claim 2, wherein a mole ratio of the initiator to the reducing agent is in the range of about 0.5 to about 10.

4. The adhesive formulation of claim 2, wherein the reducing agent comprises an aniline or a toluidine, or a combination thereof.

5. The adhesive formulation of claim 1, wherein a chelating agent in the chelating agent solution comprises a hexadentate, a bidentate, or a tridentate, or any combination thereof.

6. The adhesive formulation of claim 5, wherein the chelating agent comprises ethylenediaminetetraacetic acid tetrasodium salt (EDTA $Na_4$).

7. The adhesive formulation of claim 1, wherein the solvent further comprises glycol or alcohol, or a combination thereof.

8. The adhesive formulation of claim 1, wherein the initiator comprises a peroxide.

9. The adhesive formulation of claim 1, wherein the initiator comprises dibenzoyl peroxide (BPO) or cumene hydroperoxide (CHP), or a combination thereof.

10. The adhesive system of claim 1, wherein the initiator comprises a primary initiator or a sole initiator.

11. The adhesive formulation of claim 1, wherein the activator part comprises a carrier, a thickening agent, a colorant, or a secondary initiator, or any combination thereof.

12. The adhesive formulation of claim 1, wherein the activator part comprises a co-initiator.

13. The adhesive formulation of claim 12, wherein a mole ratio of the co-initiator to the initiator is less than about 0.5.

14. The adhesive formulation of claim 1, wherein the at least one toughening agent having the glass transition temperature of at least one domain in the range of about −25° C. to about −50° C. (about −13° F. to about −58° F.) comprises an elastomeric polymer.

15. The adhesive formulation of claim 1, wherein the at least one other toughening agent having a glass transition of at least one domain lower than −50° C. (−58° F.) comprises a block copolymer.

16. The adhesive formulation of claim 15, wherein the at least one other toughening agent having the glass transition of at least one domain lower than −50° C. (−58° F.) comprises a styrene-butadiene-styrene (SBS) copolymer.

17. The adhesive formulation of claim 1, comprising an impact modifier.

18. The adhesive formulation of claim 17, wherein the impact modifier comprises a core-shell structured polymer.

19. The adhesive formulation of claim 17, wherein the impact modifier comprises methacrylate butadiene styrene (MBS) copolymer.

20. The adhesive formulation of claim 1, wherein the at least one toughening agent having the glass transition temperature of at least one domain in the range of about −25° C. to about −50° C. (about −13° F. to about −58° F.) comprises polychloroprene.

21. The adhesive formulation of claim 1, comprising polyvinyl acetate or its derivatives, or any mixture thereof.

22. The adhesive formulation of claim 1, wherein the activator part or the adhesive part, or a combination thereof, comprises the combination of at least two toughening agents.

23. The adhesive formulation of claim 17, wherein the activator part or the adhesive part, or a combination thereof, comprises the impact modifier.

24. The adhesive formulation of claim 21, wherein the activator part or the adhesive part, or a combination thereof, comprises the polyvinyl acetate or its derivatives, or any mixture thereof.

* * * * *